Patented Oct. 12, 1948

2,451,153

UNITED STATES PATENT OFFICE 2,451,153

REACTION OF AN ETHERIFIED MELAMINE-FORMALDEHYDE CONDENSATION PRODUCT WITH AN ETHERIFIED PHENOL-FORMALDEHYDE CONDENSATION PRODUCT

William Charlton and Jack Blatchley Harrison, Blackley, Manchester, England, assignors to Imperial Chemical Industries Limited, a corporation of Great Britain No Drawing. Application January 2, 1945, Serial No. 571,123. In Great Britain February 2, 1944

8 Claims. (Cl. 260—45.1)

This invention relates to the manufacture of new resinous condensation products and more particularly it relates to the manufacture of new resinous condensation products suitable for use in oil varnishes or in stoving finishes.

According to the invention we manufacture new resinous condensation products by a process which comprises heating together in the presence of acidic condensing agents an etherified melamine-formaldehyde condensation product and an etherified phenol-formaldehyde condensation product obtainable by condensation in the presence of alkaline condensing agents of a phenol in which two of the positions o, o and p to the phenolic group are unsubstituted, with formaldehyde.

Etherified melamine-formaldehyde condensation products suitable for use according to the invention include for example etherified methylolmelamines, for example etherified hexamethylolmelamine, particularly these substances when etherified by means of monohydric alcohols, for example lower aliphatic monohydric alcohols such as methanol, ethanol, n-butanol, propanol, amyl alcohol, benzyl alcohol, cyclohexanol and β-ethoxyethanol. Also suitable are etherified melamine-formaldehyde condensation products of ill-defined composition for example those resulting from etherification of the condensation products of melamine and less than six molecular proportions of formaldehyde.

The preferred alcohols for use in etherification of the melamine-formaldehyde condensation product are n-butanol, cyclo-hexanol and β-ethoxyethanol. It is convenient to make melamine-formaldehyde condensation products etherified by means of these alcohols by reacting a methylolmelamine or a methylated methylolmelamine, for example hexamethoxymethylmelamine, with the particular alcohol to be used, in the presence of an acidic substance.

Phenol-formaldehyde condensation products which when etherified are used in the process of the invention are, as said, those made from phenols in which two of the positions o, o and p- to the phenolic group are unsubstituted. That is to say the phenol may carry in addition to the phenolic hydroxyl group a substituent in one o-position leaving the other o-position and the p-position free or it may carry a substituent in the p-position leaving both o positions free and in either case it may or may not carry substituents in the m-positions. Suitable specific phenols are for example o-cresol, p-cresol, p-ethylphenol, p-tertiary-butylphenol, p-cyclohexylphenol and p-phenyl-phenol.

The phenols defined are, as said, caused to react with formaldehyde in the presence of alkaline condensing agents and there may be obtained, according to the particular quantities and the conditions of reaction chosen, crystalline phenol dialcohols, for example p-tertiarybutylphenol dialcohol, low molecular weight condensation products containing a high proportion of methylol groups, or resinous condensation products of higher molecular weight containing methylol groups. All of these products when etherified are suitable for use in the process of the invention.

The phenol-formaldehyde condensation product as described above is etherified prior to use in the process of the invention by interaction with the appropriate monohydric alcohol by known methods, for example by heating together the phenol-formaldehyde condensation product and the monohydric alcohol in the presence of an acidic substance. Suitable monohydric alcohols for use in this etherification process are for example n-butanol, propanol, amyl alcohol, benzyl alcohol, cyclohexanol and β-ethoxyethanol. The alcohol used in the etherification of the phenol-formaldehyde condensation product may be the same as or different from that used in the etherification of the melamine-formaldehyde condensation product.

Acidic condensing agents which may be used in the process of the present invention include organic and inorganic acids and compounds which decompose to give rise to acids under the conditions of the reaction. Particularly suitable are phosphoric acid, hydrogen halides, sulphuric acid, camphor sulphonic acid, phthalic acid and stannic chloride.

The conditions under which the process of the invention is carried out may be varied according to the nature of the product it is desired to obtain. Generally the process is carried out by heating the reactants together in a suitable solvent, which conveniently may be an excess of the alcohol used in etherification of either the melamine-formaldehyde condensation product or the phenol-formaldehyde condensation product or both. The solvent however may if desired be omitted.

The reaction is usually carried out in two stages. In the first stage the temperature is preferably below that of the boiling point of the solvent being used but advisedly as high as about 100° C. and thus the solvent to be used is preferably one which has a boiling point above 100° C. The duration of the first stage of heating may vary from a few minutes to several hours. In the second stage of the reaction the temperature is raised to the boiling point of the solvent and the solvent is distilled, which distillation may, if desired, be hastened by application of reduced pressure or by passage of a stream of a gas, for example carbon dioxide or nitrogen. Heating may then be continued for a further period, if desired at a still higher temperature, until a resin of the desired properties is obtained.

The resin obtained may be soluble in drying oils for example tung oil or linseed oil or in mixtures of these or it may be insoluble in these oils in which case it is useful as a lacquer resin for stoving finishes preferably in admixture with suitable plasticisers and in solution in the usual lacquer solvents, for example aromatic hydrocarbon or alcoholic solvents, for example xylene or butanol.

If a product soluble in fatty oils is desired it is preferable to use in the reaction a relatively small proportion of the etherified melamine-formaldehyde condensation product and for a given reaction mixture it has been found that oil-solubility is favoured by (1) a low relative proportion of acidic substance, (2) a low second stage reaction temperature, (3) a short duration of the second stage of heating, (4) a high degree of etherification of the phenol-formaldehyde condensation product, and (5) a high alkoxymethyl content of the melamine condensation product.

Resins obtained according to the invention which are soluble in drying oils give, when cooked into these oils, varnishes of excellent drying properties and good colour and of good general resistance to water, to acids and to alkalis. Resins obtained according to the invention which are not soluble in drying oils when plasticised by admixture of suitable plasticisers for example castor oil alkyd resin give, when dissolved in lacquer solvents, stoving finishes with outstanding resistance to water and to alkalis.

The invention is illustrated but not limited by the following examples in which parts are by weight:

Example 1

300 parts of p-tertiarybutylphenol, 328 parts of a 36.8% (by weight) aqueous solution of formaldehyde and 3 parts of caustic soda are stirred and heated together under a reflux condenser during one hour and the product is then allowed to cool. The upper aqueous layer is removed and to the residual material is added 300 parts of n-butanol, 20 parts of xylene and 1.2 parts of phosphoric acid. This mixture is distilled in such a manner that the condensed water is removed and the condensed organic solvents are returned to the reaction vessel. This process is continued until 115 parts of water have been removed and no more will distil. There remains 723 parts of a butanol solution.

To 135 parts of the above butanol solution are added 65 parts of a 50% (by weight) solution of hexamethoxymethylmelamine in n-butanol and 0.1 part of phosphoric acid, the mixture is heated during one hour at 100° C. and the temperature is then raised to 150° C. and so maintained during 20 minutes. 97 parts of a brittle resin are obtained on cooling. This resin dissolves readily when heated with tung oil or with tung oil-linseed oil mixtures to give quick drying varnishes with very good colour.

Example 2

The process described in Example 1 is carried out except that the quantity of phosphoric acid used is 0.4 part and the second stage of heating is of only about 1.66 hours duration. A hard brittle resin is obtained which is not soluble in tung oil nor in linseed oil and readily dissolves in aromatic hydrocarbon or alcoholic solvents to give solutions suitable as stoving lacquers. When baked they quickly give hard brittle films.

Example 3

The process described in Example 4 is carried out with the exception that the second stage of heating, namely that at 150° C. is continued for only 30 minutes. A clear resin of low melting point is obtained which is readily soluble in tung oil or in linseed oil to give varnishes which dry rapidly and well to give films of very good colour.

Example 4

51 parts of p-hydroxydiphenyl dialcohol, 150 parts of n-butanol and 0.1 part of phosphoric acid are heated together under a reflux condenser during 2 hours and then 80 parts of butanol are removed by distillation during one hour. To the residue 50 parts of a 50% (by weight) solution of hexamethoxymethylmelamine in n-butanol are added. The temperature of the mixture is then raised to 150° C. and so maintained during 30 minutes. A semi-solid resin is obtained which is insoluble in tung oil but readily soluble in aromatic hydrocarbon and alcoholic solvents.

Example 5

The process described in Example 6 is repeated with the exception that the final heat treatment at 150° C. is only of only 15 minutes duration. A resin is obtained readily soluble in tung oil or in linseed oil giving varnishes which dry quickly to give films of good colour.

Example 6

45 parts of p-cresol dialcohol, 150 parts of n-butanol and 0.1 part of phosphoric acid are heated together during 2 hours and then 120 parts of butanol are distilled during one hour. To the residue are added 50 parts of a 50% (by weight) solution of hexamethoxymethylmelamine in n-butanol and the mixture is heated at 150° C. during 30 minutes. A liquid resin of dark colour is obtained which is readily soluble in tung oil, in aromatic hydrocarbons and in alcoholic solvents. The resin gives tung oil and tung oil-linseed oil varnishes which dry rapidly and well to give films of good colour.

Example 7

51 parts of p-cyclohexylphenol dialcohol, 150 parts of n-butanol and 0.1 part of phosphoric acid are heated together under a reflux condenser during 2 hours and then 50 parts of a 50% (by weight) solution in n-butanol of hexamethoxymethylmelamine are added and the mixture is heated during 1 hour at 100° C. The temperature is then raised to 150° C. and so maintained during 30 minutes. A semi-solid resin readily soluble in tung oil is obtained. Tung oil and tung oil-linseed oil varnishes prepared from this resin dry well and have a good colour.

Example 8

47 parts of p-ethylphenol dialcohol, 150 parts of n-butanol and 0.1 part of phosphoric acid are heated together under a reflux condenser during 2 hours and then 50 parts of a 50% (by weight) solution in n-butanol of hexamethoxymethylmelamine are added. The mixture is heated during one hour at 100° C. and the temperature is then raised to 150° C. and so maintained during 30 minutes. A semi-solid resin is obtained which gives tung oil and tung oil-linseed oil varnishes which dry well and have good colour.

Example 9

75 parts of n-butylated o-cresol dialcohol, 100 parts of n-butanol, 50 parts of a 50% (by weight) solution of hexamethoxymethylmelamine in n-butanol and 0.1 part of phosphoric acid are heated together during one hour at 100° C. The temperature is then raised to 150° C. and so maintained during 30 minutes. A clear red semi-liquid resin is obtained which is readily soluble in tung oil. Tung oil and tung oil-linseed oil varnishes prepared from this resin dry well.

Example 10

25 parts of a butanol solution of a butylated p-tertiary-butylphenol - formaldehyde condensation product, 75 parts of hexamethoxy-methylmelamine, 100 parts of n-butanol and 0.1 part of phosphoric acid are heated together at 100° C. during 3 hours. The n-butanol solution so obtained gives films which when stoved during 1 hour at 120° C. become hard and brittle. When plasticised with a castor oil alkyd resin the solution gives films which when baked during one hour at 120° C. give hard flexible films of good colour and outstanding resistance to water and to alkali.

The butanol solution of a butylated p-tertiary-butylphenol-formaldehyde condensation product used in the process of the above example is made by heating a mixture of 500 parts of p-tertiary-butylphenoldialcohol, 500 parts n-butanol and 40 parts xylene in a vessel fitted with an apparatus such that the condensed water is removed, and the condensed organic solvents are returned to the vessel. The process is continued until 57 parts of water have been removed when no more water will distil and there remains 978 parts of the required butanol solution.

Example 11

105 parts of the n-butanol solution of a butylated p-tertiarybutylphenol-formaldehyde condensation product used in Example 10, 70 parts of a 50% (by weight) solution of hexamethoxymethylmelamine in n-butanol and 0.1 part of phosphoric acid are heated together with stirring during one hour at 100° C. and the temperature is then raised to 150° C. and so maintained during 2.25 hours. A clear pale yellow resin of low melting point is obtained which when heated with tung oil or with tung oil-linseed oil mixtures gives varnishes which dry quickly to give films of very good colour.

Example 12

110 parts of the n-butanol solution of butylated p-tertiarybutyl phenol-formaldehyde condensation product used in Example 10, 50 parts of a 50% (by weight) solution of hexamethoxymethylmelamine in n-butanol and 0.1 part of phosphoric acid are heated and stirred together during one hour and the temperature is then raised to 150° C. and so maintained during one hour. A clear, yellow, brittle resin is obtained which is not completely soluble in tung oil nor in linseed oil but dissolves readily in aromatic hydrocarbon or alcoholic solvents.

The hexamethoxymethylmelamine used in the above Examples 1–12 is made by first interacting melamine with 6.3 molecular proportions of formaldehyde in the presence of alkali, the so-obtained hexamethylolmelamine being then treated with an excess of methanol in presence of hydrogen chloride. The syrupy material thus obtained consists essentially of hexamethoxymethylmelamine together with some material containing fewer than six methoxymethyl groups and some material containing a small proportion of unalkylated methylol groups.

Example 13

A suspension of 126 parts of melamine, 370 parts of a 36.8% (by weight) aqueous solution of formaldehyde and 3.5 parts of disodium hydrogen phosphate, is stirred at 75° C. for 0.5 hour until all the melamine is dissolved. The solution is filtered hot, the filtrate is cooled and the so-obtained paste is diluted with 100 parts of water, filtered, and the filter cake is dried at 50° C. during 12 hours. Dry hydrogen chloride is passed into a stirred suspension of 125 parts of the dried material and 450 parts of methanol for one hour when a clear solution is formed. This solution is kept below 5° C. and is neutralised to bromocresol blue at that temperature by addition of sodium methoxide, the precipitated inorganic material is then removed, and the excess methanol is distilled off at reduced pressure leaving 400 parts of an alkylated methylol melamine which is filtered to remove the deposit of inorganic material.

300 parts of p-tertiarybutylphenol-dialcohol are mixed with 300 parts of n-butanol, 30 parts of xylene, and 0.3 part of phosphoric acid, and the mixture distilled in such a manner that condensed water is removed, and condensed organic solvents are returned to the reaction vessel. The process is continued for 12 hours when 68 parts of water have been separated. There remains 55 parts of butanol solution.

To 94 parts of this solution, are added 20 parts of the alkylated methylolmelamine obtained as described above, 20 parts of n-butanol, and 0.1 part of phosphoric acid. The mixture is heated for one hour at 100° C., the temperature is then raised to 150° C. and so maintained for 1.5 hours, and then raised to 170° C. and so maintained for a further 0.75 hour. A light yellow, brittle resin is obtained, which is soluble in tung oil or tung-linseed oil mixtures to give quick drying finishes of very good colour.

We claim:

1. The process of manufacturing new resinous condensation products which comprises heating together in the presence of an acidic condensing agent (1) a soluble melamine-formaldehyde condensation product etherified with a monohydric alcohol and (2) a soluble phenol-formaldehyde condensation product etherified with a monohydric alcohol, the phenol and formaldehyde having been condensed in an alkaline condensing medium, the phenol being monohydric and having a hydrocarbon radical of 1–6 carbon atoms in one only of the o, o and p positions to the phenolic group, the remaining two of the said o, o and p groups being unsubstituted.

2. The product of claim 1.

3. The process of claim 1 in which the etherified melamine-formaldehyde condensation product is hexamethoxymethylmelamine.

4. The product of claim 3.

5. The process of claim 1 in which the etherified phenol-formaldehyde condensation product is a butylated p-tertiarybutyl-phenol-formaldehyde condensation product.

6. The product of claim 5.

7. The process of claim 1 in which the monohydric alcohol is a lower aliphatic alcohol.

8. The process of claim 1 in which the heating is carried out in two stages, the first of which is at 100° C. in the presence of a solvent boiling above 100° C., and the second stage is carried out at the boiling point of the solvent.

WILLIAM CHARLTON.
JACK BLATCHLEY HARRISON.

REFERENCES CITED

The following references are of record in the file of this patent:

UNITED STATES PATENTS

| Number | Name | Date |
| --- | --- | --- |
| 2,197,357 | Widmer et al. | Apr. 16, 1940 |
| 2,262,728 | Swain et al. | Nov. 11, 1941 |

FOREIGN PATENTS

| Number | Country | Date |
| --- | --- | --- |
| 516,344 | Great Britain | Jan. 1, 1940 |
| 527,414 | Great Britain | Oct. 8, 1940 |
| 118,408 | Australia | Apr. 17, 1944 |

OTHER REFERENCES

Gams et al., p. 508, 518 and 519, "British Plastics," Feb., 1943.